United States Patent [19]
Gribbon

[11] Patent Number: 5,589,142
[45] Date of Patent: Dec. 31, 1996

[54] INTEGRATED REGENERATIVE CATALYTIC OXIDATION/SELECTIVE CATALYTIC REDUCTION ABATEMENT SYSTEM

[75] Inventor: Sean T. Gribbon, Farmington Hills, Mich.

[73] Assignee: Salem Englehard, South Lyon, Mich.

[21] Appl. No.: 280,944

[22] Filed: Jul. 27, 1994

[51] Int. Cl.[6] .............................. F23G 7/06; F23D 14/00; B01D 50/00
[52] U.S. Cl. ................ 422/171; 422/172; 422/173; 422/175; 422/177; 422/178; 422/190; 422/198; 422/206; 431/5; 432/180; 432/181; 110/211; 110/212
[58] Field of Search ........................ 422/169–173, 422/175, 177, 178, 198, 199, 223, 206; 431/5, 7; 432/179–182; 423/237, 239, 242, 243; 110/345, 211–213

[56] References Cited

U.S. PATENT DOCUMENTS

| | | | |
|---|---|---|---|
| 3,870,474 | 3/1975 | Houston | 422/171 |
| 4,836,988 | 6/1989 | Kristof et al. | 422/171 |
| 5,000,422 | 3/1991 | Houston | 251/306 |
| 5,016,547 | 5/1991 | Thomason | 110/211 |
| 5,145,652 | 9/1992 | Veser et al. | 422/175 |
| 5,163,829 | 11/1992 | Wildenberg | 431/5 |
| 5,233,934 | 8/1993 | Krigmont et al. | 110/345 |
| 5,364,259 | 11/1994 | Matros et al. | 431/5 |

Primary Examiner—Robert J. Warden
Assistant Examiner—Hien Tran
Attorney, Agent, or Firm—Lyon, P.C.

[57] ABSTRACT

A system for the abatement of industrial process emissions comprises a catalytic oxidizer and a selective catalytic reduction bank integrated into a single housing. The system utilizes at least two regenerative chambers in a controlled abatement process. The integrated system removes volatile organic compounds (VOCs), carbon monoxide (CO), and toxic oxides of nitrogen ($NO_x$) from the process emissions. The singular housing of the present invention is efficient and eliminates the need for more than one supplementary heat source, while eliminating major pollutants from the emissions.

1 Claim, 1 Drawing Sheet

5,589,142

INTEGRATED REGENERATIVE CATALYTIC OXIDATION/SELECTIVE CATALYTIC REDUCTION ABATEMENT SYSTEM

BACKGROUND OF THE INVENTION

The present invention relates generally to the abatement of contaminant laden industrial process emissions and more particularly, to a system which utilizes a regenerative catalytic oxidizer and a selective catalytic reduction unit to perform the abatement process.

Industrial process emissions typically contain particulates and major gaseous air pollutants such as volatile organic compounds (VOCs), nitrogen oxides ($NO_x$) and carbon monoxide (CO), all of which contaminate the environment when vented to the atmosphere. Thermal oxidizers utilize a supplementary heat source to increase the temperature of the process emissions to a level above the ignition temperature of the combustible contaminants, typically ranging from 1400° F. ($\approx$760° C.) to 1500° F. ($\approx$815° C.), so as to oxidize combustible contaminants, such as VOC's and CO's. Catalytic oxidizers further utilize a catalytic material to effect oxidation of the VOCs and CO at lower peak temperatures.

Regenerative thermal and/or catalytic oxidizers recover heat remaining in the cleansed exhaust gas to increase the temperature of emissions entering the oxidizer thereby minimizing the amount of supplemental energy required to raise the emission to its ignition temperature. Characteristically, flow control valves are used to direct the emissions to one or more regenerators for preheating prior to thermal or catalytic oxidation.

Although known regenerative oxidizers effectively convert VOCs and CO to benign gases such as carbon dioxide ($CO_2$) and water vapor, oxidation does not, however, reduce the level of toxic $NO_x$ from the process emissions. In contradistinction, attenuation of the $NO_x$ concentration chemically requires a reduction reaction, as opposed to oxidation in a regenerative thermal and/or catalytic oxidizer.

Known abatement methods therefore require a separate unit to remove $NO_x$ from the process emissions. In gas turbine technology, selective catalytic reduction units utilize a reducing gas to react with $NO_x$ at elevated temperatures over a selective catalyst, thereby forming harmless gases such as nitrogen ($N_2$) and water vapor. Common examples of reducing gases include hydrogen, urea, ammonia, and cracked ammonia. The reduction reaction frequently occurs at temperatures ranging from 500° F. ($\approx$260° C.) to 700° F. ($\approx$371° C.) in the presence of a selective catalyst, or above 1200° F. ($\approx$649° C.) in the absence of a catalyst.

Alternatively, $NO_x$ may be removed by a scrubber. Generally, scrubbing is a process for removing one or more components of a mixture of gases or vapors. The gas mixture is passed upward and countercurrent to a stream of descending liquid, such as water, which removes the $NO_x$ contaminants by dissolving desired components and not others.

This bifurcated approach of removing VOCs and CO in a regenerative oxidizer and $NO_x$ in a separate unit has not proven to be satisfactory. Utilizing two separate pieces of equipment is expensive and inefficient. For example, the oxidizer effluent must be reheated in the catalytic reduction unit when reacting $NO_x$ with a reducing gas. Removing $NO_x$ in a scrubber is also problematic because waste liquid is generated, which creates yet another pollution source. Maintenance and operation of the two separate units is also expensive and cumbersome.

SUMMARY OF THE INVENTION

The aforesaid problems are solved, in accordance with a preferred constructed embodiment of the present invention, by an integrated abatement system for industrial process emissions comprising a regenerative catalytic oxidizer and a selective catalytic reduction unit disposed in a single housing. The present invention removes particulates, VOCs, CO and $NO_x$ and eliminates the need for two separate pieces of equipment for the abatement of process emissions, and therefore reduces maintenance and operational expenses. The combined single unit of the present invention further reduces fuel costs by eliminating the need for a second supplementary heat source, and also avoids the generation of contaminated waste liquid associated with a scrubber.

The integrated system of the present invention operates in cycles and comprises a plurality of regenerative beds, a corresponding number of VOC catalysts, and at least one selective reduction catalyst, all positioned in a single housing. The emissions flow from a contaminated feed duct through a selectively opened valve and inlet duct to a regenerative chamber for preheating. The emissions then flow through a VOC catalyst, which oxidizes VOCs and CO present in the emissions. In addition, a reducing gas, e.g. ammonia, is injected into the system. The oxidized emissions are mixed with ammonia and reacted over a selective catalyst which effects removal of $NO_x$. The emissions then flow into a combustion chamber and are held for a predetermined period of time, after which the purified emissions flow through a second set of components comprising a VOC catalyst and regenerative bed, and thence through an open outlet valve for venting to atmosphere or other use. Further, a second selective reduction catalyst can be included in the second set of components and positioned between the combustion chamber and VOC catalyst.

In a two regenerative bed system, a transition duct is utilized to prevent static pressure variations during a change in cycles wherein inflow and outflow are reversed. The present invention also accommodates a purge cycle which redirects cleansed exhaust air back through each respective inlet bed in order to remove trapped contaminants.

DETAILED DESCRIPTION OF THE PREFERRED EMBODIMENT(S)

Figure 1:
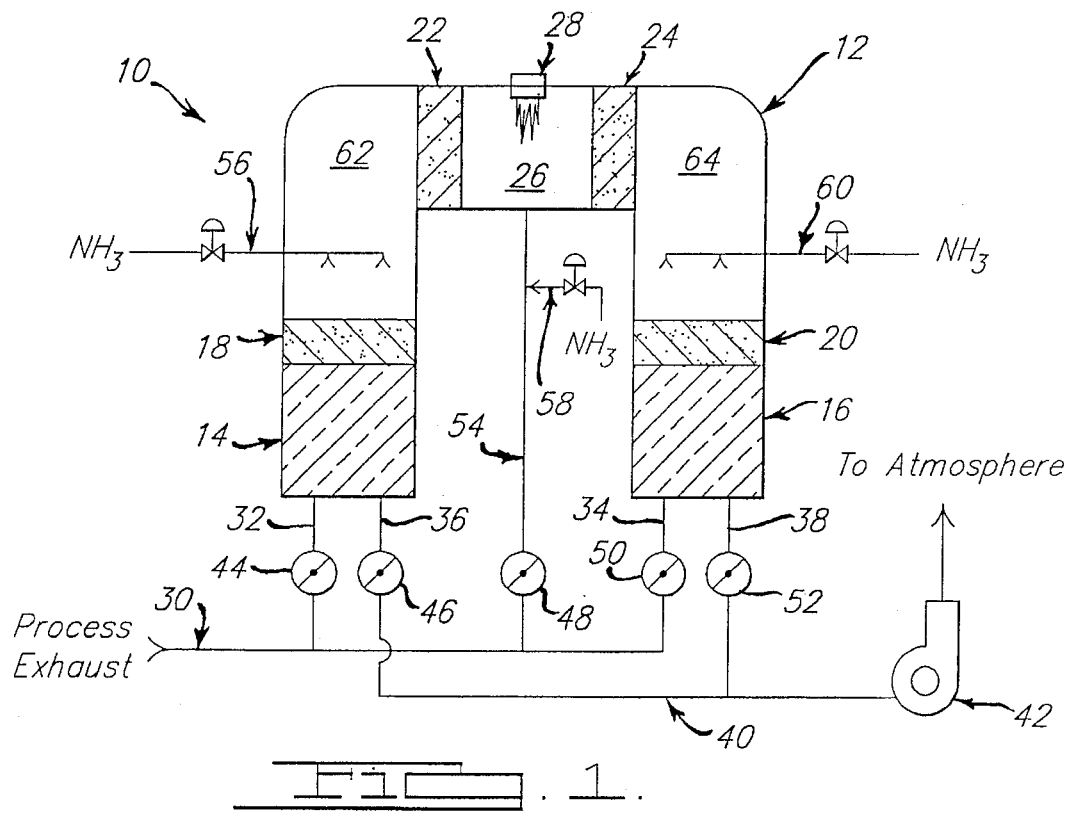
FIG. 1 is a diagrammatic representation of a first embodiment of a regenerative catalytic oxidizer/selective catalytic reduction unit, in accordance with the present invention.

In accordance with the present invention, a first embodiment for an integrated regenerative catalytic oxidizer/selective catalytic reduction abatement system (hereinafter "RCO/SCR") 10, is shown in FIG. 1 as disposed in a single housing 12. FIG. 1 shows an RCO/SCR 10 comprising two conventional regenerator beds or chambers 14 and 16, which are provided with a heat exchange media. The RCO/SCR 10 further comprises VOC catalysts 18 and 20 and selective reduction catalysts 22 and 24. The VOC catalysts may be satisfactorily implemented as, for example, platinum deposited on a substrate, and the selective reduction catalysts may be implemented as, for example, titanium and/or vanadium deposited on a substrate. The selective reduction catalysts 22 and 24 may be in either a vertical or a horizontal configuration and may be in a single bank, or in two banks as shown. A common combustion chamber 26 communicates with each selective reduction catalyst 22 and 24. Fuel, for example natural gas, is supplied to the combustion chamber 26 from a fuel controller and burner 28 or other heat source.

A contaminated emission feed duct 30 admits process emissions into the RCO/SCR 10 through a pair of inlet ducts 32 and 34, respectively. Cleansed air is conducted away from the RCO/SCR 10 by a pair of outlet ducts 36 and 38, respectively, which feed a cleansed exhaust duct 40, and is vented to atmosphere by an exhaust blower 42. The RCO/SCR 10 utilizes a plurality of valves 44, 46, 48, 50 and 52 to control the cyclic flow of contaminated emissions and cleansed air to and from the RCO/SCR 10, respectively.

The flow control valves 44 to 52 are preferably power actuated electronically controlled valves of the type disclosed in U.S. Pat. No. 5,000,422, or pending U.S. application Ser. No. 08/087,658, filed Jul. 6, 1993, both of which are assigned to the assignee of the present invention. Power actuating of the valves 44 to 52 under the control of a computer offers precise timing and positive actuation.

A transition duct 54 extends directly from the contaminated emission duct 30 to the combustion chamber 26. The transition duct 54 complements the switch from inflow to outflow during the abatement cycle changes of the two chamber regenerative system, such as described in pending U.S. application Ser. No. 08/206,970, filed Mar. 4, 1994 and assigned to the assignee of the present invention. More specifically, transition circuit valve 48 admits emissions through the transition duct 54 to prevent pressure fluctuations in the process exhaust caused by simultaneous opening and closing of flow valves 44–46 and 50–52. The transition duct 54 further prevents contaminated emissions from short circuiting the combustion chamber 26 and escaping to atmosphere.

A plurality of reducing gas input lines 56, 58 and 60 selectively inject a reducing gas, e.g. ammonia, into the transition duct 54 or into a distribution plenum 62 and 64, as will be described in more detail hereinbelow. As seen in FIG. 1, each distribution plenum 62 and 64 is respectively positioned between a VOC catalyst 18 and 20 and corresponding selective reduction catalyst 22 and 24, and operates to uniformly distribute and mix the ammonia with the process emissions.

In a first operational cycle, inlet valve 44 is open, while transition circuit valve 48 and inlet valve 50 are closed, thereby establishing chamber 14 as a feed bed and chamber 16 as an exhaust bed. Contaminated emissions, i.e. industrial process exhaust, flow through feed duct 30, inlet valve 44, and inlet duct 32 to regenerative chamber 14 wherein the emissions are preheated. The emissions then flow through VOC catalyst 18, where heat produced by burner 28 causes the VOC catalyst to catalytically effect oxidation of a substantial concentration of VOCs and CO at temperatures typically below 800° F. ($\approx$466° C). The VOC catalyst 18 may directly communicate with bed 14 (as shown), or alternatively, may be physically separated while in the same housing.

The oxidized emissions then flow from VOC catalyst 18 into distribution plenum 62 for the aforesaid uniform mixing with ammonia. The ammonia (or other suitable reducing gas) then reacts with the selective reduction catalyst 22, which receives heat from burner 28 to effect reduction of the $NO_x$. Because ammonia produces $NO_x$ upon oxidation, the ammonia is injected into the RCO/SCR 10 downstream of the VOC catalyst 18 to prevent the VOC catalyst 18 from oxidizing the ammonia.

The ammonia is injected into the distribution plenum 62 in accordance with the valve cycles of the RCO/SCR 10. More specifically, when corresponding inlet valve 44 is selectively open, ammonia is likewise injected from reducing gas input line 56. Conversely, when inlet valve 44 is closed, ammonia is not injected into distribution plenum 62. Further, a changeable offset may be utilized as an external timing control to regulate injection of ammonia in accordance with a predetermined delay following admission of process emissions into the RCO/SCR 10 through inlet valve 44.

The amount of ammonia injected by reducing gas input line 56 is controlled by a throttle valve (not shown) which continuously varies the quantity of ammonia injected into distribution plenum 62, depending upon the varying $NO_x$ concentration in the process emissions. The $NO_x$ concentration is measured manually or by a control scheme, and the throttle valve is variably set to control ammonia injection stoichiometrically. Therefore, excess ammonia is not present in the emissions.

In accordance with the present invention, the emissions therefore flow through selective reduction catalyst 22 into common combustion chamber 26. The emissions are elevated to the chamber 26 temperature for a retention time of, for example, about 0.5 seconds. The combustion chamber 26 enhances efficiency of the RCO/SCR 10 by insuring VOC and CO destruction.

The cleansed exhaust then flows out of the combustion chamber 26 into the selective reduction catalyst 22, distribution plenum 64, VOC catalyst 20, regenerative chamber 16, outlet duct 38, and open outlet valve 52 to the cleansed exhaust duct 40 and exhaust blower 42 for discharge to the atmosphere or other use. Ammonia is not injected into distribution plenum 64 during this outward emission flow. Efficiency of the RCO/SCR 10 is further enhanced because any residual amounts of VOCs and CO which escape combustion are oxidized by the VOC catalyst 20. Since regenerative chamber 16 is operating as the exhaust bed, a heat exchange between the hot exhaust and the bed media preheats the bed, thereby establishing the desired regenerative effect.

Transition duct 54 facilitates the change in cycles for the RCO/SCR 10 by preventing pressure fluctuations caused by switching flow directions in the system. In two chamber RCO/SCR 10 systems, as seen in the figures, the transition duct provides a simulated third chamber in order to prevent static pressure variations. Thus, transition circuit inlet valve 48 opens as inlet valve 44 closes and outlet flow continues through open outlet valve 52 from regenerator 16.

Transition circuit inlet valve 48 is briefly opened, e.g., for a few seconds, resulting in 100% of inlet emissions flowing through transition duct 54. Ammonia is injected into transition duct 54 from reducing gas input line 58 which reacts with $NO_x$ over reduction catalyst 24 during outward flow. The $NO_x$ concentration in the emissions is measured and ammonia is accordingly injected stoichiometrically, as described above. The VOCs and CO are oxidized by VOC catalyst 20 during outlet flow, which continues through open outlet valve 52 from regenerator 16.

Outlet valve 52 begins to close while outlet valve 46 begins to open. After the idle and operating outlet valves 46 and 52 complete the switch, transition valve 48 begins to close and inlet valve 50 begins to open. Ultimately, the second abatement cycle begins with inlet valve 50 open, outlet valve 46 open, inlet valve 44 closed, outlet valve 52 closed and transition valve 48 closed.

In operation, the second leg of the abatement cycle flows in reverse order with respect to the first cycle but with similar features. Thus, contaminated emissions flow from feed duct 30 through open inlet valve 50 and inlet duct 34 to regenerative chamber 16, now operating as the feed bed. The VOC catalyst 20 oxidizes VOCs and CO in the emissions. Oxidized emissions flow through distribution plenum 64 for mixing with ammonia. Ammonia is introduced through a throttle valve in order to preclude injection of excess ammonia. The $NO_x$ in the emissions is reacted with ammonia over reduction catalyst 24. The emissions then flow through common combustion chamber 26, thence outwardly through distribution plenum 62, VOC catalyst 18, regenerator 14, outlet duct 36, valve 46, exhaust duct 40 and exhaust blower 42. The cycles switch again, as described hereinabove by incorporating transition duct 54.

Further, the present invention may be adapted to accommodate a purge cycle. When the components of the RCO/SCR 10 have previously acted as inlet components, a slug of contaminated air may have become trapped therein. Thus, cleansed air is redirected (not shown) through each respective inlet component in order to prevent a spike of contaminated air in the exhaust when a previous inlet component acts as an outlet component.

Figure 2:
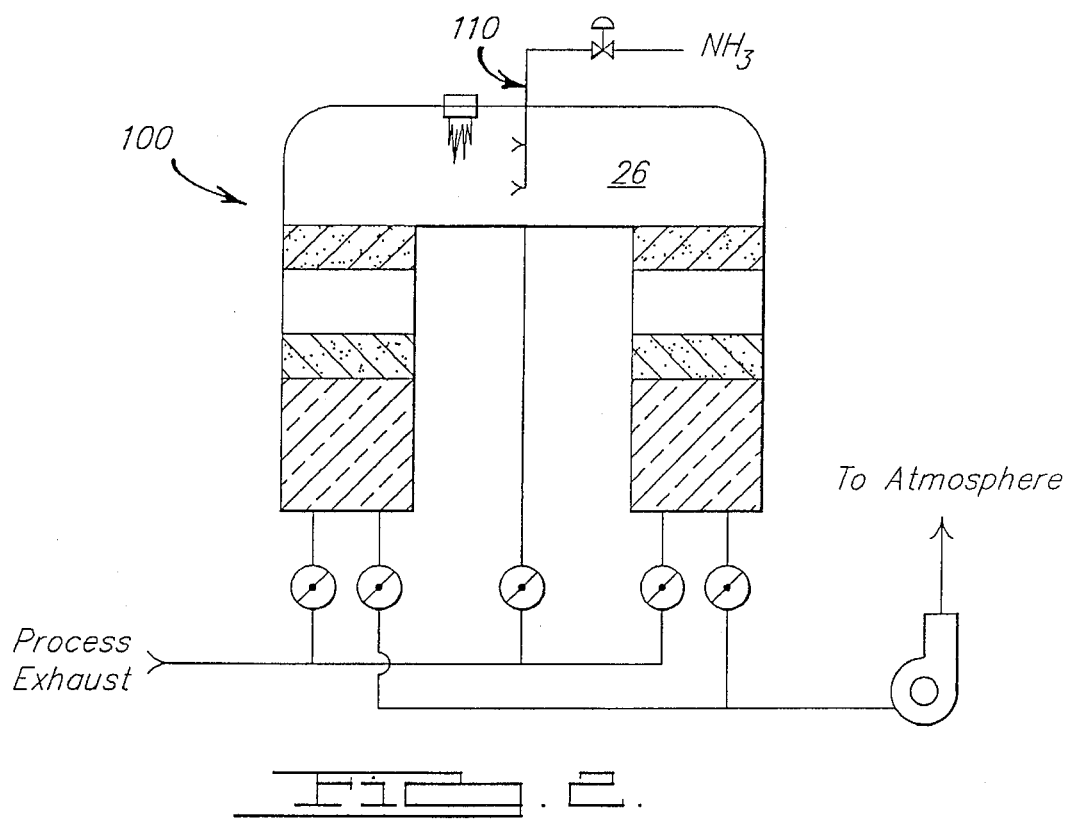
FIG. 2 is a diagrammatic representation of a second embodiment of the regenerative catalytic oxidizer/selective catalytic reduction unit, in accordance with the present invention.

Referring now to FIG. 2, a second embodiment 100 for the RCO/SCR is shown, in accordance with the present invention. A singular reducing gas input line 110 injects ammonia into the common combustion chamber 26, so that injection thereof does not require timing with the valve cycles. However, the ammonia is preferably injected through a throttle valve based upon $NO_x$ concentration in the emissions in order to preclude introduction of excess ammonia into the RCO/SCR 100, as previously described above.

As seen in the figures, the RCO/SCR preferably comprises a corresponding number of selective reduction catalyst beds or banks, relative to the number of regenerative beds. In certain environments, however, the number of selective reductive catalysts utilized in the present invention may be less than the number of regenerative beds. For example, in a two regenerative bed RCO/SCR, a single selective reduction catalyst may be sufficient to reduce the $NO_x$ concentration in the emissions to acceptable levels. When flow is then reversed in the two regenerative beds RCO/SCR, and second selective reduction catalyst, and therefore ammonia source, may not be required.

While the figures show the present invention as applied to two regenerative bed systems, one of ordinary skill in the art will readily appreciate that the features and advantages of the present invention are equally applicable to other numbers of regenerative beds, for example a three or a four bed RCO/SCR. Further, the transition duct 54 may not be required in some systems, such as a three bed system wherein the presence of the third bed inherently precludes pressure variations.

While the preferred embodiment of the invention has been disclosed, it should be appreciated that the invention is susceptible of modification without departing from the scope of the following claims.

I claim:

1. A system for removal of oxidizable contaminants and reducible gases from process emissions by an initial oxidation process and a subsequent reduction process, said system comprising:

a pair of regenerative units for receiving contaminated process emissions, selectively;

a source of contaminated process emissions;

a pair of contaminated process emission inlet conduits connected to said source and to one side of each of said regenerative units respectively;

a pair of cleansed emission outlet conduits communicating with the one side of said regenerative units, respectively and with the ambient atmosphere;

a contaminated process emission heating chamber connected to each of said regenerative units on the opposite side thereof, respectively, from said contaminated emission source;

a pair of catalytic oxidizers connected between said regenerative units, respectively, and said heating chamber for oxidizing contaminants in said process emissions;

a pair of reducing gas injectors between said catalytic oxidizers, respectively, and said heating chamber;

a pair of catalytic reduction units between said reducing gas injectors, respectively, and said heating chamber;

a pair of inlet valves in said inlet conduit between the source of contaminated process emissions and the one side of each of said regenerative units, respectively;

pair of outlet valves in said outlet conduits between the one side of said regenerative units, respectively and with the ambient atmospheres, said inlet and outlet valves being openable and closable for reversing the flow of contaminated process emissions and cleansed exhaust to and from said regenerative units, respectively;

a transition duct connected between the source of process emissions and said heating chamber for conducting contaminated process emissions directly to said heating chamber; and a reducing gas injector communicating directly with said heating chamber for injecting reducing gas into contaminated emissions introduced into said heating chamber by said transition duct.

\* \* \* \* \*

UNITED STATES PATENT AND TRADEMARK OFFICE
CERTIFICATE OF CORRECTION

Page 1 of 2

PATENT NO. : 5,589,142

DATED : December 31, 1996

INVENTOR(S) : Sean T. Gribbon

It is certified that error appears in the above-indentified patent and that said Letters Patent is hereby corrected as shown below:

Col. 1, line 21 after "(≈760°C" delete ".".

Col. 1, line 21 after "(≈815°C" delete ".".

Col. 4, line 32 after "catalyst" delete "22". insert --24--.

Col. 5, lines 16  after "through" insert -- the selective reduction catalyst 22,--.

Claim 1,
Col. 6, line 18 after "units" insert --,--.
(page 1, line 10, claim 4)

Claim 1,
Col. 6, line 38 before "pair" insert --a-- to
(page 2, line 21, claim 4)    begin subclaim.

UNITED STATES PATENT AND TRADEMARK OFFICE
CERTIFICATE OF CORRECTION

PATENT NO. : 5,589,142
DATED : December 31, 1996
INVENTOR(S) : Sean T. Gribbon

It is certified that error appears in the above-indentified patent and that said Letters Patent is hereby corrected as shown below:

```
Claim 1,
Col. 6, line 38 before "pair" insert --a-- to
                                  begin subclaim.
```

Signed and Sealed this

Seventh Day of October, 1997

BRUCE LEHMAN

*Attest:*

*Attesting Officer*      Commissioner of Patents and Trademarks